No. 860,163. PATENTED JULY 16, 1907.
J. B. TOWNSEND.
SIGNAL FOR PRESSURE GAGES.
APPLICATION FILED JAN. 29, 1907.
2 SHEETS—SHEET 1.
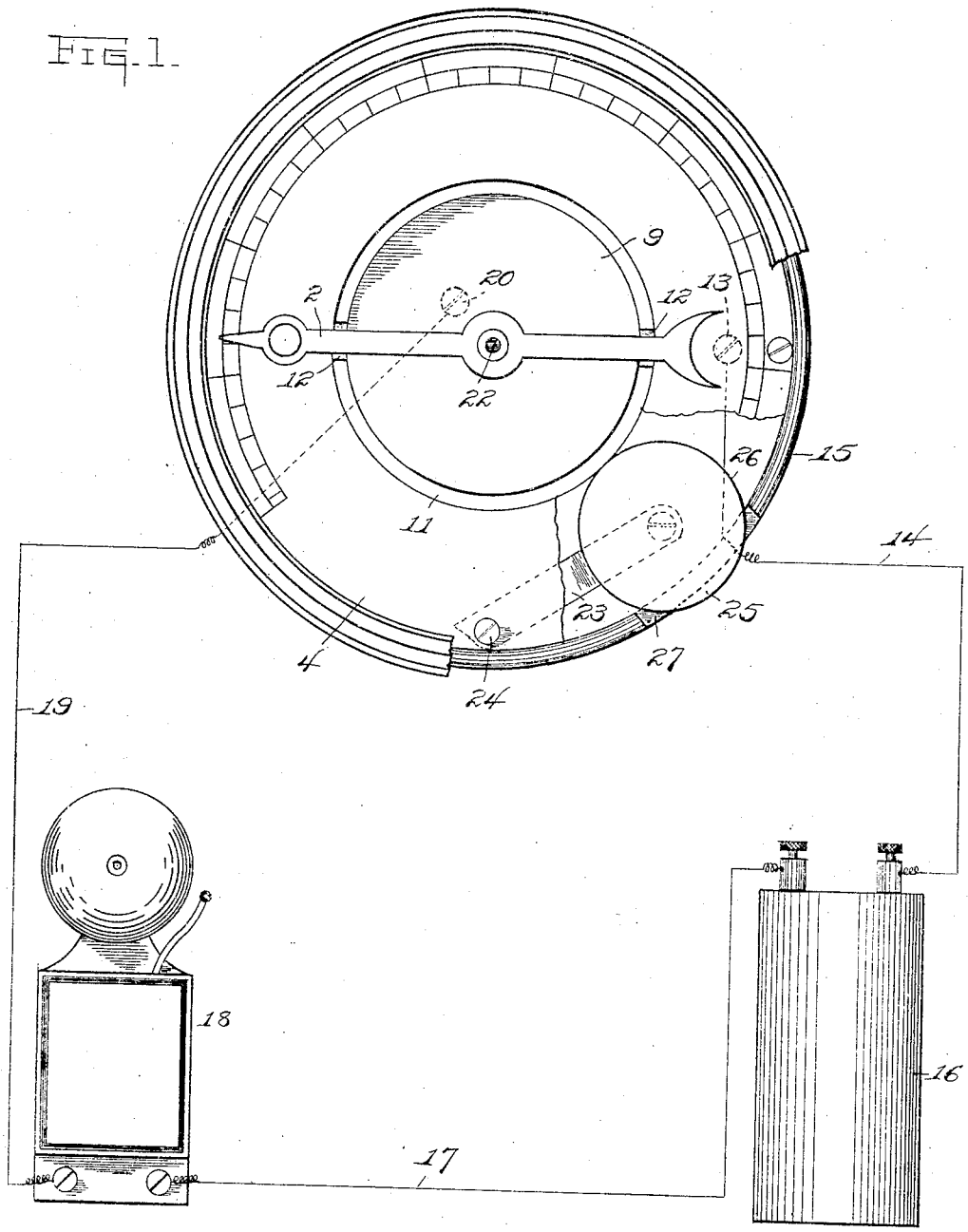
WITNESSES:
INVENTOR
John B. Townsend No. 860,163. PATENTED JULY 16, 1907.
J. B. TOWNSEND.
SIGNAL FOR PRESSURE GAGES.
APPLICATION FILED JAN. 29, 1907.
2 SHEETS—SHEET 2.
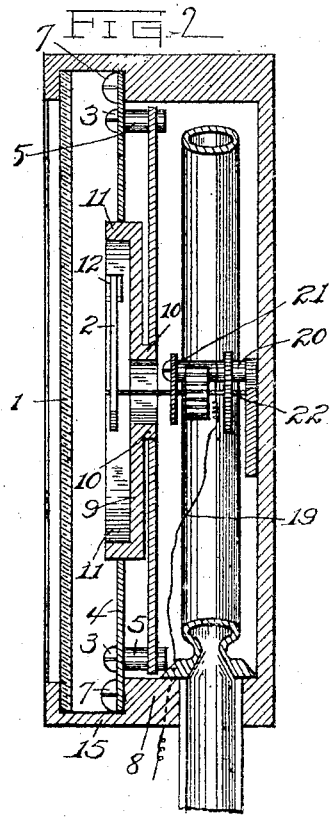
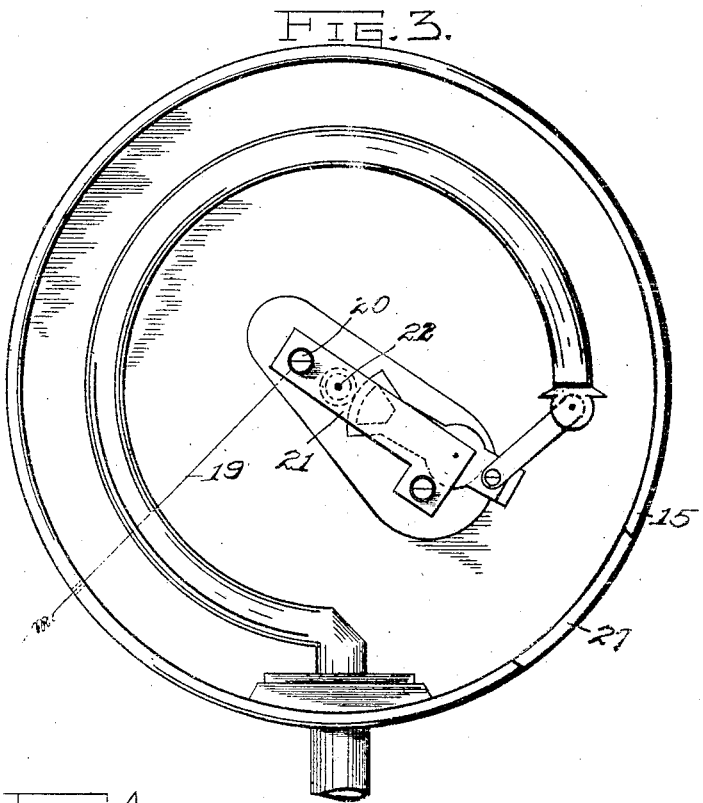
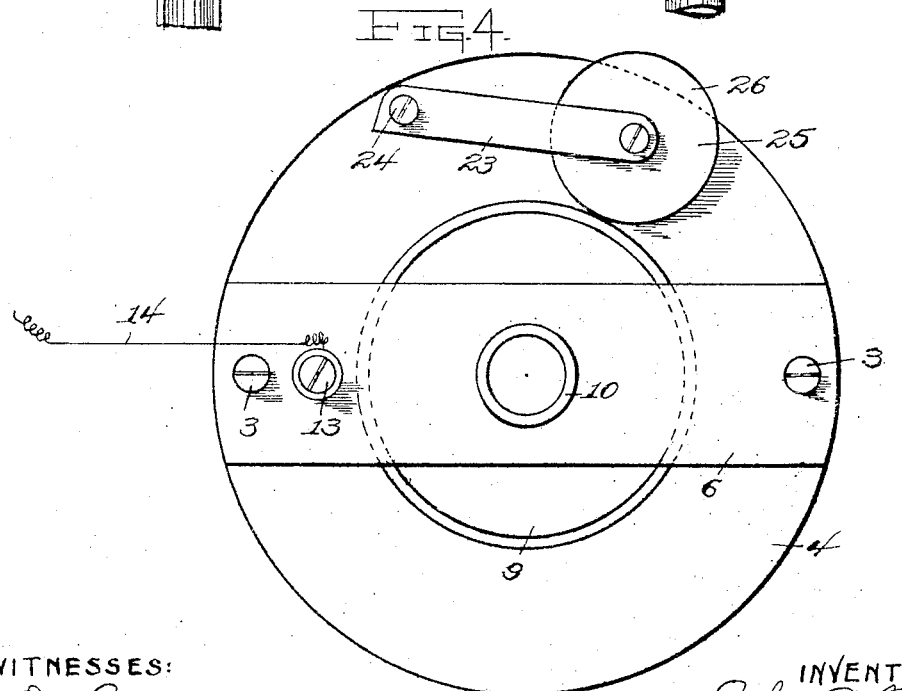
WITNESSES:
INVENTOR
John B. Townsend

UNITED STATES PATENT OFFICE.

JOHN B. TOWNSEND, OF WELLFORD, WEST VIRGINIA.

SIGNAL FOR PRESSURE-GAGES.

No. 860,163.  Specification of Letters Patent.  Patented July 16, 1907.

Application filed January 29, 1907. Serial No. 354,620.

*To all whom it may concern:*

Be it known that I, JOHN B. TOWNSEND, a citizen of the United States of America, and a resident of Wellford, county of Kanawha, and State of West Virginia, have invented certain new and useful Improvements in Signals for Pressure-Gages, of which the following is a specification.

My invention relates to new and useful improvements in signals for pressure gages, and more particularly to an alarm signal for that class of gages employed for indicating the pressure of steam, gas, water, or the like; and it consists in the particular construction, arrangement and combination of parts which will hereinafter be fully described.

The object of the invention is to provide a simple, inexpensive and efficient means whereby a predetermined maximum or minimum pressure recorded by a gage may be announced for directing the attention of an attendant thereto.

In describing the invention in detail, reference is herein had to the accompanying drawings, forming a part of this specification, in which—

Figure 1 is a face view, partially broken, of an ordinary pressure-gage, showing my invention applied thereto; Fig. 2 is a vertical section of the same; Fig. 3 is a face view of the gage with the dial and its correlated parts removed, showing the recess or slot in the side of the casing and the interior mechanism of an ordinary gage; and Fig. 4 is a plan view of the under side of the dial.

Referring to said drawings, in which like reference-numerals designate like parts throughout the several views—1 indicates the glass face of the gage, which latter may be of any preferred type of construction, having the hand or indicator 2 ordinarily employed in connection therewith for indicating the pressure.

Connected by screws 3 to the dial 4 on the under side thereof and spaced and held away therefrom by washers 5 is a cross-plate 6. Said dial is secured as ordinarily by screws 7 to the supporting posts 8. Within a central circular aperture in the dial 4 is a disk 9 having an integral hollow spindle 10 revolubly mounted in said cross-plate 6. Said disk has integral therewith a circular upright rim 11 having oppositely disposed notches 12 therein in which the indicator lies normally out of contact with the side-edges of the notches. Said disk is connected through its spindle 10, the cross-plate 6, a binding-post 13 mounted in said plate, and a conducting wire 14 leading through the casing wall 15 to one pole of a battery 16 or other source of electrical energy. The other pole of the battery is connected by a conducting wire 17 to the signal, which may be a lamp or a bell 18, the latter being shown in the drawings, which signal is indirectly connected by a wire 19 to the indicator 2. The connection of the wire 19 with the indicator may be made in any suitable manner, but is preferably made through the interior mechanism, or works, of the gage, the mechanism so involved in the present instance comprising the post 20, plate 21 and the post 22 upon which said indicator is mounted, said mechanism being of an ordinary type.

As a means for adjusting the disk 9, a bar 23 is pivotally attached at 24 to the under side of the dial, and said bar 23 carries a revoluble disk 25, preferably of leather or having a peripheral leather band 26 thereabout, which normally lies in frictional engagement with said disk 9. Said disk 25 lies at one side within or protrudes from a recess or slot-like opening 27 in the casing wall 15 in convenient position to be rotated by hand. In adjusting the position of the disk 9 the disk 25 is pressed inward into frictional contact with the disk 9 and is then rotated, rotating said disk 9.

As is obvious, the disk 9 is adjusted with its serrations or notches underlying the indicator in such position that the latter is free to rotate within a certain range. When either of the predetermined pressures for which the disk is adjusted are indicated, the indicator contacts with the side edges defining the notches, closing the electric circuit to the signal lamp or bell, as the case may be, giving the alarm. The amount of variation of pressure admitted before the alarm is given may be regulated by the width of the notches 12 provided in the rim or flange 11.

The disk 9 being freely rotatable, does not interfere with the movement of the indicator, the former being carried around with the latter after contact is made therewith. Consequently, danger of deranging the mechanism is eliminated.

I have described my invention in what I consider to be its simplest form, but it is obvious that various changes within the scope of the appended claims may be resorted to without departing from the general spirit or scope of the invention. Hence I do not desire to limit myself to the precise construction and arrangement of parts herein shown and described.

Having thus described my invention, what I claim as new, and desire to secure by Letters Patent, is—

1. In a device of the character described, the combination with a pressure-gage having a dial and a movable indicator, of a rotatable disk supported centrally under said indicator, said disk being provided with oppositely disposed notches in which said indicator stands, the edges defining said notches being in the path of movement of said indicator, an electric circuit one pole of which is connected to said indicator and the opposite pole to said disk, and a signal in said circuit and operated by the closing thereof.

2. In a device of the character described, the combination with a pressure-gage having a movable indicator, of a rotatable disk supported under said indicator, a peripheral flange carried by said disk and having notches therein, said disk being adapted for adjustment to bring said notches under said indicator, said notches being adapted to admit of free movement of said indicator between predetermined points, an electric circuit one pole of which is connected to said indicator and the opposite pole to said member, and a signal in said circuit and operated by the closing of the latter.

3. In a device of the character described, the combination with a pressure-gage having a movable indicator, of an adjustable flanged disk mounted under the indicator and normally out of contact therewith, said disk having oppositely disposed notches in its flange, and being adapted for adjustment with said notches underlying said indicator to admit of a certain range of undisturbed movement in the latter and to be contacted at predetermined points in its movement, an electric circuit between said indicator and said disk which is adapted to be closed by their contact, and a signal in said circuit.

4. In a device of the character described, the combination with a pressure-gage having a movable indicator, of a flanged disk revolubly mounted beneath said indicator, said disk having a notch or serration in its flange in which said indicator is adapted to freely move and with the side-edges of which said indicator is adapted to contact, an electric circuit established by such contact, and a signal in said circuit.

5. In a signal for pressure-gages, the combination with a gage having a centrally apertured dial and a movable indicator, of a cross-plate carried by said dial on its under side, a disk revolubly mounted in said cross-plate and revolubly held in the central aperture of the dial, a peripheral flange carried by said disk, notches provided in said flange, said disk being adapted for adjustment to bring said notches under said indicator, which notches admit of the free movement of said indicator between certain predetermined points for which said disk is adjusted, said indicator being adapted to contact with the defining edges of said notches at said predetermined points in its movement, an electric circuit one pole of which is connected to said indicator and the other to said disk, a signal in said circuit, said signal being actuated by the closing of the circuit established through said contact, and a second revoluble disk in frictional contact with the first-mentioned disk whereby the latter may be rotated, said second disk protruding through a slot in the gage casing.

In testimony whereof I affix my signature in presence of two subscribing witnesses.

JOHN B. TOWNSEND.

Witnesses:
   D. C. TAYLOR,
   E. R. OGLEVEE.